March 21, 1933.   C. F. COVEY   1,902,219
STEAM TRAP
Filed June 6, 1929
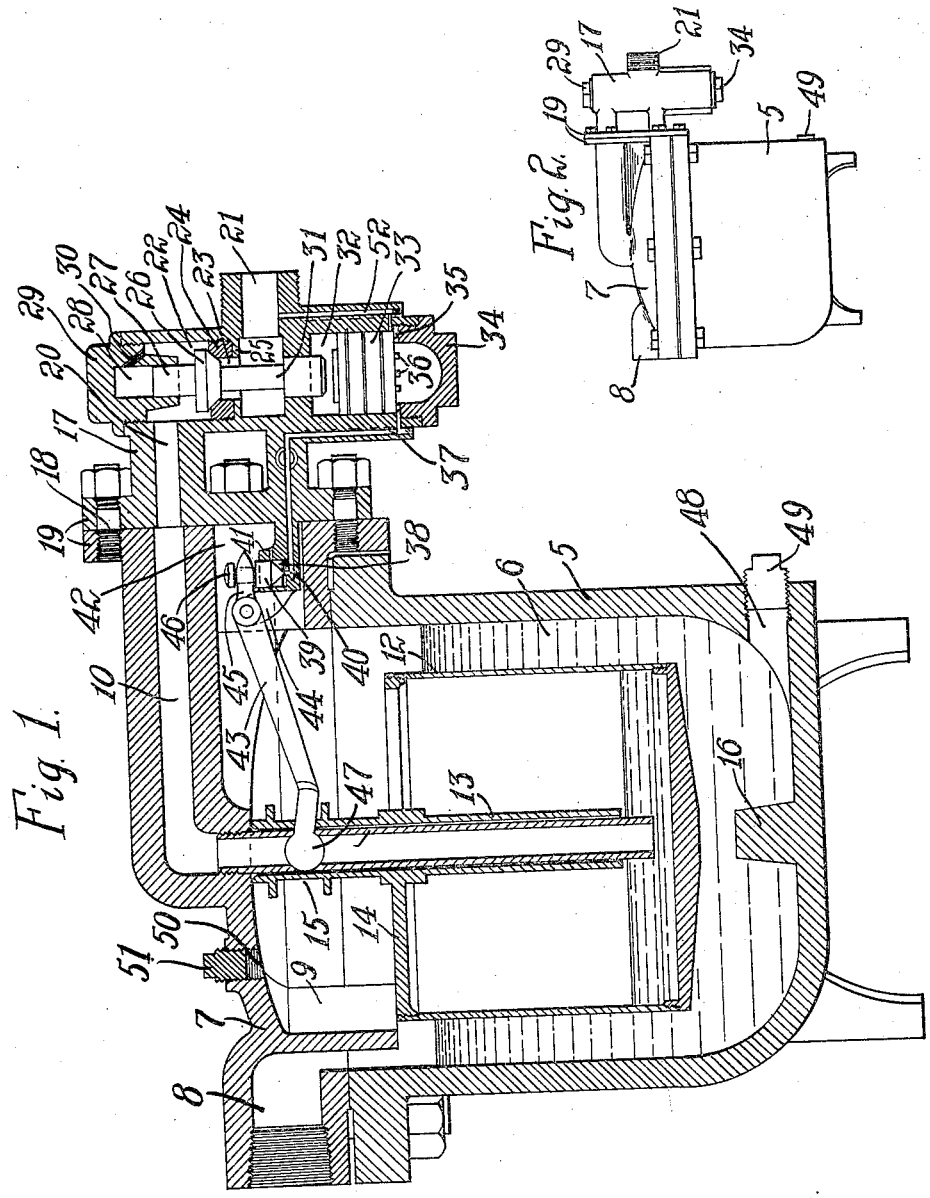
INVENTOR
Clarence F. Covey
By Bromley Seeley
His Attorney Patented Mar. 21, 1933

1,902,219

UNITED STATES PATENT OFFICE

CLARENCE F. COVEY, OF PITTSBURGH, PENNSYLVANIA, ASSIGNOR TO McAULEY AUTOMATIC TRAP COMPANY, OF PITTSBURGH, PENNSYLVANIA, A CORPORATION OF DELAWARE

STEAM TRAP

Application filed June 6, 1929. Serial No. 368,778.

This invention relates to steam traps, and an object of this invention is to provide a steam trap of improved construction and operation.

Most steam traps in use today are so constructed that it is necessary to reduce the size of the condensate discharge orifice and hence the capacity of the trap, when the trap is to be used with the higher steam pressures now in use, in order to permit the leverage of the valve operating arm to open the discharge valve against the high pressure in the trap chamber.

A further object is to provide a steam trap of improved construction and arrangement capable of use with high steam pressures without having its capacity reduced or unnecessarily limited by a restricted discharge orifice.

A still further object is to provide a steam trap of the type set forth which will be rugged and durable in construction, reliable in operation and simple and cheap to manufacture and assemble.

These and other objects which will be apparent to those skilled in this particular art are accomplished by means of the invention illustrated in the accompanying drawing in which Figure 1 is a transverse sectional view through a steam trap constructed in accordance with one embodiment of this invention. Fig. 2 is a reduced side elevation of the trap illustrated in Fig. 1.

In the particular embodiment of the present invention which has been chosen for the purposes of illustration, the condensate collecting chamber is formed in the main body portion of the trap and the operating parts are associated with, or connected to, the cover which is clamped to the main body portion so as to enclose the condensate collecting chamber. A discharge outlet is formed in the lid and the main or condensate discharge valve together with a pilot valve for controlling the operation of opening and closing the main valve are located in cooperative arrangement in a single discharge operating unit which is separable from the trap body without affecting the steam connections.

As illustrated, the invention includes a body member 5 formed so as to provide a condensate collecting chamber 6 closed at the top by a cover 7 having a condensate inlet port 8 formed therein and an associated downwardly extending baffle 9, for directing the water entering the chamber through the inlet port downwardly toward the bottom of the chamber. The cover is also provided with a condensate discharge passage 10 communicating at the center of the cover with a downwardly extending discharge pipe 11 which extends downwardly into the chamber a predetermined distance. The discharge pipe also acts as a guide for the vertical movement of a condensate collecting bucket 12 provided with a sleeve 13 supported in a spider 14 and surrounding the discharge pipe 11. The sleeve extends upwardly above the bucket and is provided with a groove 15, the upper end of the sleeve being adapted to engage the cover to limit the upward movement of the bucket 12, the extent of downward movement of which is limited by a suitable stop 16.

The mechanism for causing and controlling the discharge of condensate from the trap is arranged in a single discharge unit 17 which is mounted on the cover 10 by suitable securing bolts and nuts 18 for connecting the associated clamping flanges 19, this arrangement permitting the discharge unit to be secured to, or detached from, the trap without the necessity of applying any wrenches or twisting strains to the unit itself. The unit is provided with a discharge passage 20 which forms, in effect, a continuation of the discharge passage 10 in the trap top 7 and which leads to a discharge port 21 through a valve chamber 22 having a port 23 surrounded by a removable valve seat 24 threaded in place against a seat positioning shoulder or flange 25. A discharge valve 26 is associated with the valve seat 24 and provided with a top guide pin 27 adapted to be received within a guide chamber 28 formed in a valve chamber cap or closure member 29 which is threaded in place and easily accessible from the top of the discharge unit. A passage 30 is provided between the interior of the guide chamber 28 and the main valve chamber 22 to prevent trapping of air or other fluid in the chamber. The main valve has a lower guide pin 31 extending into a piston chamber 32 formed in the bottom of the unit and enclosing a piston 33 which constitutes a part of the main valve actuating mechanism all of which is associated with the single detachable discharge unit 17. The bottom of the piston chamber 32 is closed by a cap or closure 34 threaded in place and provided with a cut away portion 35 opening through notches 36 to the piston chamber below the piston 33 to permit pressure to enter the chamber from a passageway 37, communicating at its other end with a pilot valve chamber 38. A pilot valve 39 controls the communication between the port 40 leading to the passage 37 and a port 41 connecting the valve chamber 38 with a chamber 42 formed in the top 7 and communicating directly with the condensate collecting chamber 6 of the steam trap. Operation of the pilot valve 39 is occasioned by the rise and fall of the bucket 12, through a pilot valve operating lever 43 pivoted on a bracket 44 formed on the discharge unit adjacent the pilot valve chamber and having a yoke 45 engaging the pilot valve stem below a collar 46, the other end of the lever having a similar yoke 47 engaging in the groove 15 of the bucket sleeve 13.

The trap has the usual blow off opening, normally closed by any suitable means such as a plug 49.

A similar opening 50 normally closed by a plug 51 is located in the top 7 for use when the trap is employed in connection with a pneumatic system instead of with steam systems, as is well known in the art.

The steam trap construction above described as illustrative of my invention provides a single discharge unit in which all operating parts except the bucket are mounted, so that the main discharge valve, the pilot valve, and the operating mechanism can all be removed from the trap without in any way disturbing the steam connections. The main valve 26 and valve seat 24 are accessible for grinding merely by removing the cap 29 and the piston chamber 33 is also accessible with equal ease. All operating parts are either formed in or secured to the steam trap top 7 and the main body of the trap is merely employed to provide the condensate collecting chamber.

In operation, the condensate enters the port 8 and is directed downwardly by the baffle 9 to the bottom of the collecting chamber 6. The counter weighted bucket 12 is lifted by the condensate and the pilot valve 39 is closed, the main valve 26 also being closed, the parts being in the position illustrated in Fig. 1. As the condensate rises above the sides of the bucket, water will accumulate in the latter, forming an effective water seal around the bottom of the discharge pipe 11. When a sufficient quantity of water has collected in the bucket, the latter will fall, swinging the lever 43 downwardly and lifting the pilot valve 39 so as to establish communication from the condensate collecting chamber 6 through the communicating chamber 42, passage 41, port 40, passage 37 and openings 36 to the bottom of the piston chamber 32. The pressure delivered to the chamber 32 raises the piston 33 and, its area being materially greater than the area of the valve 26, the differential in pressure will raise the valve so as to open the port 23 and permit the pressure to force the condensate in the bucket upwardly through the discharge pipe 11 and the discharge passageways 10 and 20 to the discharge port 21. As the bucket is emptied, it will rise again, maintaining a safe water seal around the bottom of the discharge pipe 11, the pilot valve will be closed and the pressure below the piston 33 will escape through the passageway 52, permitting the valve 26 to seat by gravity until the next operation of the trap.

What I claim as new and desire to secure by Letters Patent is:

1. A steam trap having in combination a body member forming a condensate collecting chamber, a condensate discharge control unit separably removable from said body member and having a main valve for controlling the discharge of condensate from said chamber, a condensate discharge pipe positioned in said chamber, a vertically movable bucket having a grooved guide sleeve surrounding said pipe, a pilot valve for controlling the delivery of operating pressure from said chamber to said main valve and a pilot valve operating lever mounted on said unit and having a yoke positioned in the groove of said sleeve and freely removable therefrom.

2. A steam trap having in combination a body member forming a condensate collection chamber, a cover therefor having a condensate discharge passage formed therein, a condensate discharge pipe connected with said passage and extending vertically downwardly into said chamber, a condensate collecting bucket in said chamber, means for guiding said bucket for vertical movement along said pipe, a condensate discharge controlling mechanism removably supported as a unit on said body member and including a main valve for controlling the discharge through said discharge passage and adapted to be normally closed by the pressure in said chamber, a pilot valve for controlling the delivery of opening pressure to said main valve, and a pilot valve operating lever pivotally mounted on said unit and having its inner end arranged to operatively engage said bucket by the act of positioning said unit in place on said member whereby the movement of said bucket operates said pilot valve.

3. A steam trap having in combination a body member forming a condensate collection chamber, a cover therefor having a condensate discharge passage formed therein, a condensate discharge pipe connected with said passage and extending vertically downward into said chamber, a condensate collecting bucket in said chamber, means for guiding the vertical movement of said bucket on said pipe including a sleeve surrounding said pipe and extending upwardly above said bucket, spaced collars on said sleeve forming a groove therebetween, a discharge controlling mechanism removably supported as a unit on said body member including a main valve for controlling the discharge through said discharge passage adapted to be normally closed by the pressure in said chamber, a pilot valve mounted on said unit for controlling the delivery of opening pressure to said main valve, a pilot valve operating lever pivotally mounted on said unit, a yoke formed at the inner end of said unit and arranged to operatively engage the groove between said collars by the act of positioning said unit in place on said member whereby movement of said bucket operates said pilot valve.

In testimony whereof, I have hereunto subscribed my name this 28th day of May, 1929.

CLARENCE F. COVEY.